United States Patent [19]

Maeda et al.

[11] 4,102,576
[45] Jul. 25, 1978

[54] MONOCHROMATOR COMBINING A PLURALITY OF LIGHT DISPERSING ELEMENTS

[75] Inventors: Yoshio Maeda; Koichi Matsumoto, both of Katsuta; Kenji Fukuda, Mito, all of Japan

[73] Assignee: Hitachi, Ltd., Tokyo, Japan

[21] Appl. No.: 734,636

[22] Filed: Oct. 21, 1976

[30] Foreign Application Priority Data

Oct. 27, 1975 [JP] Japan .................. 50/129023

[51] Int. Cl.$^2$ ............................................. G01J 3/12
[52] U.S. Cl. .................................................. 356/101
[58] Field of Search ....................... 356/101, 51, 92

[56] References Cited

U.S. PATENT DOCUMENTS

| 2,948,185 | 8/1960 | Ward et al. | 356/101 |
| 3,098,408 | 7/1963 | Cary | 356/101 |

*Primary Examiner*—Vincent P. McGraw
*Attorney, Agent, or Firm*—Craig & Antonelli

[57] ABSTRACT

The present monochromator comprises a plurality of monochromator portions including one prism and at least one diffraction grating, the prism being arranged in the first or final portion. In order to cover a deviation of light having a required wavelength at an exit slit, resulting from the variation of refractive index of the prism due to the variation of temperature and from the rotational error of the prism and in order to increase the amount of exit light, the width of an entrance or exit slit adjacent to the prism is held always greater by a constant value $a$ than an intermediate slit adjacent to the prism. The value $a$ is selected to be equal to either $a_T$ or $a_r$ shown by the following expression or greater than it, $$a_T = D_p \Delta \lambda_T$$

$$a_r = D_p \Delta \lambda_r$$

where $D_p$ is a line dispersion of the monochromator portion due to the prism, $\Delta \lambda_T$ is a deviation of wavelength resulting from the variation of refractive index of the prism due to the variation of temperature, and $\Delta \lambda_r$ is a deviation of wavelength resulting from the rotational error of the prism.

12 Claims, 5 Drawing Figures

MONOCHROMATOR COMBINING A PLURALITY OF LIGHT DISPERSING ELEMENTS

BACKGROUND OF THE INVENTION

1. Field of the Invention

The present invention relates to a monochromator combining as light dispersing element one prism and at least one diffraction grating in series, and more particularly to a monochromator having its slit width so set as to cover a deviation of wavelength resulting from the variation of refractive index of the prism due to the variation of temperature and a deviation of wavelength resulting from the rotational error of the prism.

2. Description of the Prior Art

A conventional dispersion type monochromator using a diffraction grating and/or prism which serves as light dispersing element combines a plurality of light dispersing elements in order to achieve the higher resolving power or less stray light. A double monochromator using the two light dispersing elements is embodied, for example, by the combination of a diffraction grating and a prism; a diffraction grating and another diffraction grating; or a prism and another prism. The monochromator using the combination of the two diffraction gratings has the drawbacks that it needs a filter for screening light having the different wavelength of unnecessary orders and that it has a great loss of light amount because of the employment of the two diffraction gratings having a poor energy efficiency. The double monochromator using the combination of the two prisms, on the other hand, has the drawback that it cannot obtain a sufficient resolving power because of a poor dispersion coefficient although it has little stray light. In this respect, it is general that a double monochromator which combines the prism and diffraction grating is commonly used. The double monochromator of this kind is provided with an entrance slit, an intermediate slit and an exit slit other than the prism and diffraction grating.

In this double monochromator, it is important to arrange the prism and diffraction grating so that they may rotate in a precisely interlocking manner in order to obtain light of various needed wavelengths. The poor rotational accuracy in a single monochromator using a prism or a diffraction grating causes the degraded precision in wavelength of exit light but gives no influence upon the amount of exit light. In the double monochromator using the prism and diffraction grating, however, the poor rotational accuracy undesirably causes not only the poor precision of wavelength but the reduction in amount of exit light because the passing wavelength range of the intermediate slit deviates from that of the exit slit. For this reason, this double monochromator needs a precisely following rotational mechanism which allows the prism and diffraction grating to interlock precisely and rotate so that the same wavelength can pass through the slits. From the viewpoints of a technique and expense, however, it is difficult to improve the rotational accuracy more precisely than a certain limitation, so that the drawback of the rotational error actually remains and has not been solved satisfactorily.

It is necessary to scan the wavelength in a case where the above-mentioned double monochromator is used as spectrophotometer.

In the above-mentioned double monochromator the diffraction grating can be driven by means of a feed screw, for example, according to a sine-bar system to change the wavelength linearly. There is, on the other hand, no effective method but to make use of a drive by means of cams in order to change the wavelength linearly because the refractive index of the prism varies non-linearly with respect to the wavelength. It is, however, very troublesome to manufacture precise cams. Generally, the refractive index of the prism relative to the wavelength is experimentally determined, so that the refractive index relative to any wavelength can be found precisely only with difficulty. Finally, a method must be used in which the manufactured cam is mounted in the monochromator, then ground during the measurement of the wavelength of the exit light and finished so as to change the wavelength linearly. This method requires very troublesome operations. There is further another method in which a lever mounted on the rotational axis of the prism is elongated to form the cam to be large-sized and to increase the precision of the cam. However, this disadvantageously causes the monochromator itself to be large-sized.

A more serious problem is that the refractive index of the prism depends upon temperatures. The variation of the refraction index due to the variation of the temperature very undesirably causes the deviation of wavelength of the exit light as well as the reduction in amount of exit light.

The drawbacks of the double monochromator have been described above, but they appear not only in the double monochromator but also in a monochromator including the combination of more than three light dispersing elements.

In order to overcome the above-described drawbacks and to facilitate the manufacture of the monochromator using a plurality of light dispersing elements, a method can be proposed in which, for a monochromator having the prism at a position nearest to the entrance slit, the slit width of the entrance slit is made constant to a relatively large predetermined width and slit width of the intermediate slit and exit slit are made variable in an interlocking manner, while, for a monochromator using the prism at a position nearest to the exit slit, the slit width of the exit slit is made constant to a relatively large predetermined width and slit widths of the entrance slit and intermediate slit are made variable in an interlocking manner, thereby obtaining exit light having a needed wavelength bandwidth and amount of light. In the form method in which the width of the entrance slit is made constant to a certain value, the width of the entrance slit which is smaller than that of the two other slits causes not only the meaningless determination of the slit width because of a direct influence of the rotational error of the prism, but also the loss of light by an amount corresponding to the reduction of the slit width. The width of the entrance slit greater than that of the other two slits, or the other hand, allows the elimination of influence due to the rotational error of the prism and the prevention of the loss of light, but causes the reduction in resolving power. Further, a width of the entrance slit must greater than that of the other two slits undesirably causes much stray light to be produced. The stray light decreases in a wavelength range in which the prism has a good dispersion while it increases in an wavelength range in which it has a poor dispersion. It will, therefore, be understood that these methods also cannot eliminate the above-mentioned drawbacks satisfactorily.

SUMMARY OF THE INVENTION

An object of the present invention is to provide a monochromator combining one prism and at least one diffraction grating, wherein harmful influence resulting from the rotational error of the prism and the variation of refraction index of the prism due to a variation of temperature are removed without any significant degradation of advantages of a monochromator comprising a combination of a plurality of light dispersing elements, that is, the advantages of removal of stray light and improvement in resolving power.

Another object of the present invention is to provide a monochromator combining one prism and at least one diffraction grating, wherein the amount of exit light increases.

Other objects and features of the present invention will be apparent from the following description in combination with the accompanying drawings.

DETAILED DESCRIPTION OF THE INVENTION

Figure 1:
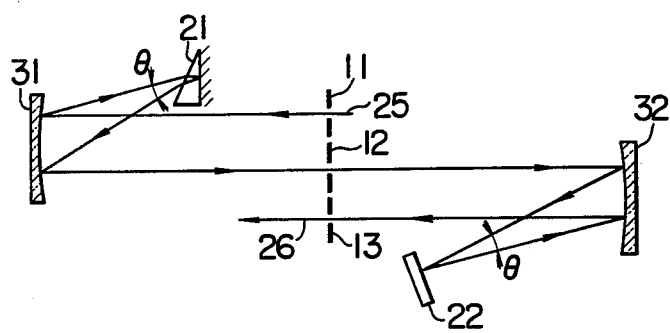
FIG. 1 is an illustrative view for the present invention, showing one example of an optical system of a Littrow-type double monochromator.

FIG. 1 shows one example of an optical system for a double monchromator including a prism and a diffraction grating each of which serves as light dispersing element. The double monochromator has a Littrow arrangement. Incident light 25, passing through the first portion of the monochromator comprising an entrance slit 11, a first collimating mirror 31, a prism 21 and an intermediate slit 12, is converted to monochromatic light and taken as exit light 26 having a wavelength bandwidth $\Delta\lambda$ after it has passed through the second portion of the monochromator comprising the intermediate slit 12, a second collimating mirror 32, a diffraction grating 22 and an exit slit 13. Such a monochromator can provide the smallest wavelength bandwidth $\Delta\lambda$ of the exit light and the greatest resolving power when the slit width $S_1$ of the entrance slit 11 is substantially equal to the slit widths $S_2$ and $S_3$ of the intermediate and exit slits 12, 13. For a monochromator with an asymmetrical Czerny-Turner arrangement which the magnification is not equal to one, the smallest band of wavelength and thus the maximum resolving power can be achieved when a ratio of their slit widths is equal to magnification. For convenience of simplicity, consideration will next be given to an example in which each portion of the monochromator has a magnification of one. Such a double monochromator makes it possible to change the wavelength $\lambda$ of the exit light 26 by rotating the prism 21 and diffraction grating 22, and it is provided with an adjuster for adjusting the slit widths $S_1$, $S_2$ and $S_3$ of each slit.

Figure 2:
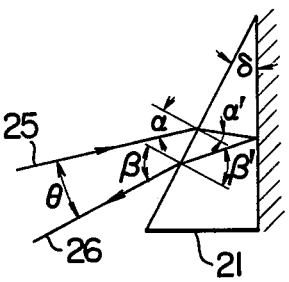
FIG. 2 is an illustrative view showing a dispersion of light by a prism.
Figure 3:
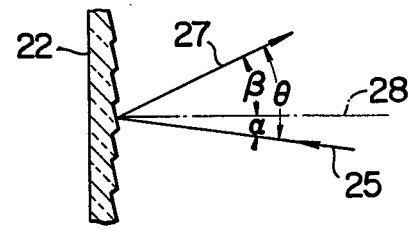
FIG. 3 is an illustrative view showing a dispersion of light by a diffraction grating.

Now assume that the prism 21 is a Littrow type prism of a vertical angle of $\delta$ as shown in FIG. 2. The prism is coated on its other side, i.e., on a patched portion in the figure to provide a reflector. Let $\alpha$ be an angle of incidence, $\beta$ an angle of exit, $\phi$ an angle of deviation, that is, an angle between the incident light and exit light, and $n$ a refractive index of the prism. These angles are related by $$\sin \alpha = n \sin \alpha' \quad (1)$$

$$\sin \beta = n \sin \beta' \quad (2)$$

$$\beta - \alpha = \theta \quad (3)$$

$$\alpha' + \beta' = 2\delta \quad (4)$$

where $\alpha'$ and $\beta'$ are selected as shown in FIG. 2. $n$ depends upon the wavelength. From the four expressions, an angular dispersion $d\theta/d\lambda = d\beta/d\lambda$ is given by $$\frac{d\theta}{d\lambda} = \frac{d\beta}{d\lambda} = \frac{\sin 2\delta}{\cos \alpha' \sqrt{1 - n^2 \sin^2 \beta'}} \frac{dn}{d\lambda} \quad (5)$$

on the assumption of a constant angle $\alpha$ of incidence. Since the prism is generally used in substantially the smallest angle of deviation, the anglar dispersion for the smallest angle of dispersion, by making $\theta = 0$, i.e., $\alpha = \beta$, $\alpha' = \beta' = \delta$, is given by $$\frac{d\beta}{d\lambda} = \frac{2 \sin \delta}{\sqrt{1 - n^2 \sin^2 \delta}} \cdot \frac{dn}{d\lambda} \quad (6)$$

For a case of the vertical angle = 30°, which is used most commonly, the expression (6) is written as follows:

$$\frac{d\beta}{d\lambda} = \frac{1}{\sqrt{1 - \frac{n^2}{4}}} \frac{dn}{d\lambda} \quad (7)$$

In the diffraction grating, on the other hand, the following expression is given, $$m\lambda = d (\sin \alpha + \sin \beta) \quad (8)$$

where $\alpha$ is the angle of incidence, $\beta$ is the angle of diffraction, $d$ is a grating constant and $m$ is the order of diffraction of light. On the assumption that the angle $\alpha$ of incidence is constant and the order $m$ of diffraction of light is one, the angle dispersion $d\beta/d\lambda$ is obtained as follows:

$$\frac{d\beta}{d\lambda} = \frac{1}{d \cdot \cos \beta} \quad (9)$$

The refractive index of the prism is, on the other hand, dependent on the temperature. Let $dn/dT$ be the variation of the refractive index $n$ to the temperature T. A variation $d\lambda/dT$ of the wavelength $\lambda$ in a predetermined exit position to the temperature T is given by $$\frac{d\lambda}{dT} = \frac{\frac{dn}{dT}}{\frac{dn}{d\lambda}} \qquad (10)$$

In the double monochromator as shown in FIG. 1, a deviation of wavelength will now be taken into account, which appears in the intermediate slit due to the rotational error of the prism. Assuming that $D_p$ (mm/nm) is a line dispersion (deviation of a specific wavelength on the intermediate slit relative to a unit wavelength difference) of the monochromator portion by the prism and $\Delta\lambda_r$ is a deviation of wavelength relative to the maximum permissible rotational error of the prism, a deviation $a_r$ (mm) of wavelength on the intermediate slit is given by $$a_r = D_p \cdot \Delta\lambda_r \qquad (11)$$

Assuming, on the other hand, that $\Delta\lambda_T$ (nm) is a deviation of wavelength due to the maximum permissible temperature variation in a common use, a displacement $a_T$ (mm) of wavelength is expressed by $$a_T = D_p \cdot \Delta\lambda_T \qquad (12)$$

Now considering the monchromator with the Littrow arrangement having a prism of the same vertical angle $\delta$ as above, the line dispersion $D_p$ is derived from the expression (6) by assuming the minimum angle of deviation, that is, $\theta = 0$, as follows:

$$D_p \simeq f \cdot \frac{d\beta}{d\lambda} = f \cdot \frac{2\sin\delta}{\sqrt{1 - n^2\sin^2\delta}} \cdot \frac{dn}{d\lambda} \qquad (13)$$

where $f$ is the focal length of the first collimating mirror.

Let, on the other hand, $\Delta\theta$ be the rotational error of the prism, and $\Delta\lambda_r$ is obtained from the expression (6), as follows:

$$\Delta\lambda_r = \frac{\sqrt{1 - n^2\sin^2}}{2\sin\delta} \cdot \frac{1}{\frac{dn}{d\lambda}} \cdot \Delta\theta \qquad (14)$$

Further assuming that $\Delta T$ is the range of temperatures within which the monochromator is used, $\Delta\lambda_T$ is derived from the expression (10) as follows:

$$\Delta\lambda_T = \frac{\frac{dn}{dT}}{\frac{dn}{d\lambda}} \cdot \Delta T \qquad (15)$$

The following expression can be obtained from the expressions (11) to (15):

$$a_r = f \cdot \Delta\theta \qquad (16)$$

$$a_T = \frac{2\sin\delta}{\sqrt{1 - n^2\sin^2\delta}} \cdot \frac{dn}{dT} \cdot f \cdot \Delta T \qquad (17)$$

If the width $S_1$ of the entrance slit is made always greater by $a$ than the width $S_2$ of the intermediate slit, that is, if a relation $$S_1 = S_2 + a \text{ ($a$ being a constant)} \qquad (18)$$

is made to be held, then the light passing through the intermediate slit increases in comparison with the example of $S_1 = S_2$ and further little or no influence exists which results from the rotational error of the prism or refractive index of the prism. However, the reduction in resolving power or increase in stray light undesirably occurs. If now $a$ is made to be equal to $a_r$ to $a_T$ or greater than it, that is, if $$a \geq a_r \text{ or } a_T \qquad (19)$$

then it will be understood that the rotational error or the variation of temperature has no influence upon the exit light at the intermediate slit. A relation $$a \geq a_r + a_T \qquad (20)$$

will suffice to make the complete removal of both the influences due to the rotational error and the temperature variation.

Now calculating the actual values of the angular dispersion $d\beta/d\lambda$ according to the expression (7) for an example of a prism made of fused quartz, $d\beta/d\lambda$ 0.0004 rad/nm for $\lambda = 300$ nm, $d\beta/d\lambda = 0.000026$ rad/nm for $\lambda = 800$ nm, and $d\beta/d\lambda = 0.000017$ rad/nm for $\lambda = 1500$ nm.

In other words, the obtain the accuracy, for example, of $\Delta\lambda = 0.1$ nm, the permissible rotational error $\Delta\phi$ of the prism is 0.00004 rad for $\lambda = 300$ nm, 0.0000026 rad for $\lambda = 800$ nm and 0.0000017 rad for $\lambda = 1500$ nm. Assume that the focal length $f$ of the first collimating mirror 31 has a common value of 400 mn. From the expression (16), the value $ar$ is, respectively, 0.016 mm, 0.0010 mm and 0.00068 mm for $\lambda = 300$ nm, 800 nm and 1500 nm.

On the other hand, the variation $dn/dT$ of the temperature T to the refractive index $n$ for the fused quartz is about $10^{-5}/C°$. The $dn/d\lambda$ in the expression (7) is, respectively, about 0.00027/nm, 0.000017/nm and 0.000012/nm for $\lambda = 300$ nm and 1500 nm. In view of $$\frac{d\lambda}{dT} = \frac{\frac{dn}{dT}}{\frac{dn}{d\lambda}}$$

derived from the expression (10), it is understood that the variation of the tuned wavelength $\lambda$ relative to the variation of temperature of 1° C is calculated to be about 0.037 nm, 0.59 nm and 0.83 nm for $\lambda = 300$ nm, 800 nm and 1500 nm. If, therefore, the available temperatures range from 5° to 35° C, then the range of the permissble temperature is 30° C, so that the value of $\Delta\lambda_T$ is about 1.1 nm, 18 nm and 25 nm, respectively, for $\lambda = 300$ nm, 800 nm and 1500 nm. The $f$ is, on the other hand, assumed to be 400 mm and $d\beta/d\lambda$ is, respectively, 0.0004 rad/nm, 0.000026 rad/nm and 0.000017 rad/nm for $\lambda = 300$ nm, 800 nm and 1500 nm as mentioned above, so that, from the expression (13), the line dispersion $D_p$ is, respectively, 0.16 mm/nm, 0.010 mm/nm and 0.0068 mm/nm for $\lambda = 300$ nm, 800 nm and 1500 nm. Accordingly, the above-mentioned values are substituted into the expression (12) to find $a_T = 0.18$ mm, 0.18 mm and 0.17 mm for $\lambda = 300$ nm, 800 nm and 1500 nm.

On the above calculation, the deviation $\Delta\lambda_T$ of wavelength resulting from the variation of temperature was calculated with due regard to only the variation of refraction index of the prism. However, a deviation of wavelength also results from expansion or contraction of the driving mechanism and the cam for driving the prism and of the lever fixed to the rotating shaft of the prism for transmitting the driving force of the cam to the prism due to the variation of temperature. Therefore, strictly speaking, the deviation $\Delta\lambda_T$ of wavelength resulting from the variation of temperature should be calculated as a sum of a deviation of wavelength resulting from the variation of refraction index of the prism and that resulting from expansion or contraction of the mechanical parts due to the variation of temperature. The deviation of wavelength due to the mechanical parts generally is very smaller than that resulting from the variation of refraction index of the prism due to the variation of temperature. It is possible to reduce a substantial deviation of wavelength due to the variation of temperature to a smaller value than that resulting from the variation of refractive index of the prism, for example, by assembling the lever made of a material with a large coefficient of thermal expansion so as to compensate the deviation of wavelength resulting from the variation of refraction of refractive index of the prism due to the variation of temperature. In this case, the $\Delta\lambda_T$ must be determined to be a smaller value than that obtained from the expression (10).

From the above results of calculation, it will be understood that a $\geqq$ 0.20 mm, 0.18 mm and 0.17 mm for $\lambda$ = 300 nm, 800 nm and 1500 nm according to the expression (20) will suffice to provide the complete removal of both the influences resulting from the rotational error of the prism and the temperature variation of the prism in the monochromator as shown in FIG. 1.

The lower limit of the value of $a$ can be obtained as mentioned above. The excessive value of $a$, however, causes not only the reduction of the resolving power but the mixture of the exit light with the light of the unnecessary orders due to the diffraction grating. Therefore, the consideration will be given to the upper limit of the value of $a$ to remove such stray light. A large value of $a$ leads to a very wide wavelength bandwidth $\Delta\lambda$ of the exit light in the first monochromator portion. If, however, $\lambda$ = 3/2 $\Delta\lambda$ relative to the central wavelength, then the shortest wavelength ($\lambda - \Delta\lambda/2$) and the longest wavelength ($\lambda + \Delta\lambda/2$) hold the relation 2($\lambda - \Delta\lambda/2$) = $\lambda + \Delta\lambda/2$. In the second monochromator portion in which the diffraction grating is used, the ($\lambda + \Delta\lambda/2$) coincides with the second order light of diffraction of ($\lambda - \Delta\lambda/2$), so that the function of the prism in the first monochromator portion to screen the light of unnecessary orders is damaged. The $a$ is, therefore, so determined as to be $\lambda \geqq$ 3/2 $\Delta\lambda$, i.e., $$\Delta\lambda \leqq 2/3 \ \lambda \qquad (21)$$

Considering that the width $S_1$ of the entrance slit to obtain this wavelength bandwidth $\Delta\lambda$ is equal to $D_p \cdot \Delta\lambda$, the calculation according to the above-mentioned numerals show that $S_1$ = 32 mm, 5.5 mm and 6.8 mm for $\lambda$ = 300 nm, 800 nm and 1500 nm, respectively. These values are much greater than the width of the actually used slit. This, therefore, shows that it is very easy to make the entrance slit width smaller than these values in view of the condition of the expression (20). Generally, the greater the $a$ is, the poorer the resolving power of the first monochromator portion is and the more stray light appears as mentioned above while the greater the wavelength bandwidth of the exit light is in the case of an additive dispersion. It is, therefore, preferable to make the $a$ substantially equal to the right side of the expression (20). Of course the value of $a$ is so determined as to satisfy the above expression (19) in a case where an attempt is made to remove the influences of the wavelength deviation which results either from the temperature variation of refractive index of the prism or the rotational error of the prism.

In the expression 18, the relation between the $S_1$ and $S_2$ has been shown, but the greatest resolving power can be achieved in the monochromator of the present invention when the widths $S_2$ and $S_3$ are equal to each other, that is, when $$S_1 = S_2 + a = S_3 + a \qquad (22)$$

Figure 4:
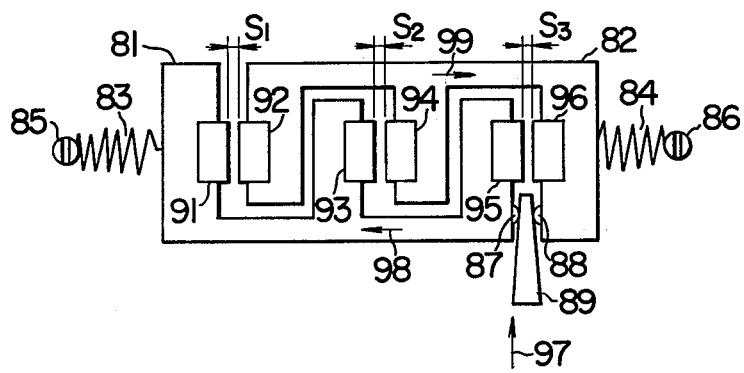
FIG. 4 is a schematic front view showing one embodiment of a slit-width adjusting device for a monochromator according to the present invention.

In this respect, it is preferable to determine the width of the three slits so as to hold the relation (22) and to vary them in an interlocking manner so as to make the variations of the three slits widths equal to one another to vary the wavelength bandwidth or amount of exit light while maintaining the relation of the expression (22). FIG. 4 shows one embodiment to achieve its method. Slit pieces 91, 93 and 95 are mounted on a movable plate 81 and slit pieces 92, 94 and 96 on a movable plate 82. The first slit $S_1$ is defined by an gap between the slit pieces 91 and 92, the second slit $S_2$ by an gap between the slit pieces 93 and 94 and the third slit $S_3$ by an gap between the slit pieces 95 and 96. The movable plates 81, 82 are, respectively pressed by springs 83 and 84 mounted against fixed portions 85 and 86 so that each width of the slits may be zero. A wedge 89 is inserted in the direction of an arrow 97 between balls 87, 88 respectively mounted on the movable plates 81, 82 to cause the movement of the movable plate 81 in the direction of an arrow 98 and the movable plate 82 in the direction of an arrow 99. It is, therefore, understood that the entrance, intermediate and exit slits have their slit width made variable in an interlocking manner with the same variation. If the slits pieces 91, 92 are so mounted on the movable plates 81, 82 that the slit pieces 91, 92 has their gap $a$ when the slit pieces 93, 94 and 95, 96 have the gap of zero, then the slit widths $S_1$, $S_2$, $S_3$ of the entrance, intermediate and exit sits always satisfy the relation of the expression (22).

Figure 5:
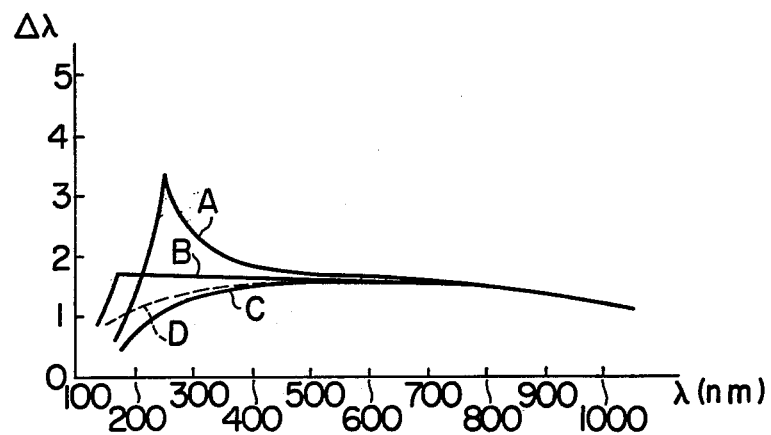
FIG. 5 is a graph for illustrating effects of the present invention.

The wavelength bandwidth of the exit light will now be taken into account. As mentioned above, the angular dispersion of the single monochromator using the prism as the dispersing element is given by the expression (5), and the angular dispersion of the single monochromator using the diffraction grating as dispersing element is given by the expression (9). In the double monochromator as shown in FIG. 1, therefore, the wavelength bandwidth of the exit light can be calculated in consideration of the addition of the dispersion of the first monochromator portion to that of the second monochromator portion for the additive dispersion and the subtraction therefrom for the subtractive dispersion on the assumption that the focal lengths $f_1$, $f_2$ of the first and second collimating mirrors 31, 32 and the widths $S_1$, $S_2$, $S_3$ of the entrance, intermediate and exit slits 11, 12 and 13 are known. Similarly as in the above-described example, it is assumed that the prism is made of fused quartz with the vertical angle of $\delta$ = 30°, the grating constant of the diffraction grating is $d$ = 1/1200 mm, the first and second monochromator portions have the Littrow arrangement with the angle of dispersion of $\theta \simeq 0$, and $f_1$ = $f_2$. Curves A, B and C in FIG. 5 show calculation results of the wavelength bandwidth of the exit light in dependence upon the wavelength λ when $S_1 = S_2 = S_3$. In the figure, the abscissa shows the wavelength λ and the ordinate shows the wavelength bandwidth Δλ (in arbitrary unit) of the exit light. The curve A shows the wavelength bandwidth of the exit light for the subtractive dispersion using the prism in the first monochromator portion and the diffraction grating in the second monochromator portion. On the side of wavelength range shorter than about 250 nm, the wavelength bandwidth is the same as that in the single monochromator using the prism. The curve B shows the wavelength bandwidth for the subtractive dispersion using the diffraction grating in the first monochromator portion and the prism in the second monochromator portion. The wavelength bandwidth is the same on the side of wavelength longer than 170 nm as that of the single monochromator including the diffraction grating, and follows the cosine function of the angle β of exit as is apparent from the expression (9). The curve C corresponds to the additive dispersion. In this case, it is irrespective of which portion of the first and second monochromator uses the prism or diffraction grating. The curve C shows that the longer the wavelength is, the more similar it is to the cure B, that is, the curve for the single monochromator including the diffraction grating be cause the dispersion by the prism is much poorer in the region of but wavelengths than the dispersion by the diffraction grating.

Attention is now given to a variation of the wavelength bandwidth Δλ of the exit light relative to the wavelength λ. The difference between the maximum $\Delta\lambda_{max}$ and the minimum $\Delta\lambda_{min}$ of the wavelength bandwidth Δλ of the exit light in the usually used wavelengths ranging from about 180 to 1000 nm is about 2.6 in the curve A, about 0.45 in the curve B and about 0.8 in the curve C as derived from FIG. 5. It will be understood that the wavelength bandwidth is kept most constant for the curve B, i.e., for the subtractive dispersion with the diffraction grating in the first monochromator portion when the wavelength is caused to change with each slit width kept equal. On the other hand, consider that the entrance slit width $S_1$ is made greater by $a$ than $S_2 = S_3 = S$ according to the expression (22) according to the present invention. A curve D in FIG. 5 can be obtained with respect to the wavelength bandwidth of the exit light for the additive dispersion when, for example, $a/S = 1/5$. It is understood that the wavelength bandwidth Δλ in the curve D is greater than that in the curve C by an amount by which the entrance slit is made wider. This is remarkable particularly in the short wavelength range in which the prism has a good dispersion. The difference ($\Delta\lambda_{max} - \Delta\lambda_{min}$) in the curve D is, however, about 0.4, somewhat smaller than that in the curve B, and thus the wavelength bandwidth is substantially constant. In this case, the difference ($\Delta\lambda_{max} - \Delta\lambda_{min}$) depends upon the value of $a/S$, but it will be apparent that the wavelength bandwidth in the curve D is always more preferable than that in the curve C for the same additive dispersion irrespective of the values of $a/S$ be cause the curve D always exits betwen the curves B and C.

In the above embodiment, the description has been made of the double monochromator, and primarily of the double monochromator with the Littrow arrangement using the prism in the first monochromator portion and the diffraction grating in the second monochromator portion as shown in FIG. 2. It will, however, be apparent that the same applies for other arrangements without being limited to the Littrow type arrangement. The objects and features of the present invention can further be achieved also for the arrangement including the diffraction grating in the first monochromator portion and the prism in the second monochromator portion if the width $S_3$ of the exit slit is wider by a predetermined width $a$ than the widths $S_1$ and $S_2$ of the entrance and intermediate slits, that is, if $S_3 = S_1 + a = S_2 + a$. Further, in a multi-monochromator in which the entrance slit, the first monochromator portion (light dispersing element), the first intermediate slit, the second monochromator portion ... the $(n - 1)$-th intermediate slit, the n-th monochromator portion and the exit slit are arranged along the optical path of the incident light in that order, quite the same objects and features can be achieved by making the width of the entrance slit wider by $a$ than that of the first intermediate slit for an arrangement including the prism in the first monochromator portion and the diffraction grating in the other monochromator portions, and by making the width of the exit slit wider by $a$ than the width of the $(n - 1)$-th intermediate slit for an arrangement including the prism in the n-th monochromator portion and the diffraction grating in the other monochromator portions.

As mentioned above, the present invention has the various important features:

(1) even if the rotational accuracy of the prism is reduced, the influences resulting from the reduction in rotational accuracy can be removed by making the width of the entrance or exit slit disposed adjacent to the prism wider by $a$, so that the rotational mechanism is easy to be manufactured, and a small-sized monochromator can be manufactured;

(2) no loss of light amount from the exit light even if the monochromator portion including the prism and the monochromator portion including the diffraction grating are not in precise tuning in the same wavelength;

(3) influences of deviation of wavelength or loss of light amount from the exit light can be eliminated which result from the variation of refractive index of the prism due to the temperature;

(4) the width of the corresponding slit can be so determined as to make minimum the increase in wavelength bandwidth of the exit light and in stray light determinative to the properties of the monochromator including a plurality of light dispersing elements, resulting from the widening of its slit; and (5) the variation of the wavelength bandwidth relative to the wavelength of the exit light can be made small by arranging the monochromator portion including the prism and the other monochromator portions including the diffraction grating in the mode of the additive dispersion.

Thus, the present invention can provide the inexpensive monochromator having excellent properties of the resolving power and the amount of exit light and is free from the stray light and influence of ambient temperature.

We claim:

1. A monochromator combining a plurality of light dispersing elements, comprising $(n + 1)$ slits, $n$ light dispersing elements and a plurality of optical collimating elements, $n$ being a natural number, wherein an entrance slit, a first light dispersing element, a first intermediate slit, ..., an $n$-th light dispersing element and an exit slit are successively arranged in a travelling direction of light along its optical path with one of the first and the $n$-th light dispersing element being formed of a prism and each of the other light dispersing elements or another element being formed of a diffraction grating, and the width of the slit disposed adjacent to said prism at the end of the optical path in the monochromator being made greater by a predetermined width than the width of an intermediate slit disposed adjacent to said prism, said predetermined width being not smaller than a deviation of light having a required wavelength resulting from either rotational errors or variation of refractive index of the prism due to variation of temperature.

2. A monochromator according to claim 1, wherein the width of the slit disposed adjacent to said prism at the end of the optical path in the monochromator is made by a constant value $a$ greater than the width of the intermediate slit disposed adjaeent to said prism, said value a being not smaller than a sum of $a_r$ and $a_T$ expressed by $$a_r = D_p \cdot \Delta\lambda_r$$

$$a_T = D_p \cdot \Delta\lambda_T$$

where $D_p$ is a line dispersion of the monochromator portion due to the prism, $\Delta\lambda_r$ is a deviation of wavelength resulting from the rotational error of the prism and $\Delta\lambda_T$ is a deviation of wavelength resulting from the variation of refraction index of the prism due to the variation of temperature.

3. A monochromator according to claim 2, further comprising a slit width adjusting device for varying the width of the slits disposed on both sides of the prism while holding said value $a$ constant.

4. A monochromator according to claim 1, wherein the width of the slit disposed adjacent to said prism at the end of the optical path in the monochromator is so set that the wavelength bandwidth of light passing through a slit on the exit side of said prism is not greater than two-thirds of the central wavelength of its passing light.

5. A monochromator according to claim 1, wherein all the slits other than the slit disposed adjacent to said prism at the end of the optical path in the monochromator is equal.

6. A monochromator according to claim 5, including a first member on which slit pieces on the same side of each slit are commonly mounted, a second member on which slit pieces on the other side of each slit are commonly mounted, and means for effective a relative displacement between the first and second members, the slit disposed adjacent to said prism at the end of the optical path in the monochromator having a required slit width when the slits other than said slit are closed.

7. A monochromator according to claim 1, wherein each of the light dispersing elements is arranged in the mode of an additive dispersion.

8. A double monochromator, in which an entrance slit, a first light dispersing element, an intermediate slit, a second light dispersing element and an exit slit are successively arranged in a travelling direction of light along its optical path with one of said two light dispersing elements being formed of a prism and the other being formed of a diffraction grating, the width of the slit disposed adjacent to said prism at the end of the optical path in said monochromator being made greater by a predetermined width than the width of the intermediate slit, said predetermined width being not smaller than a deviation of light having a required wavelength resulting from either rotational errors or variation of refractive index of the prism due to variation of temperature.

9. A double monochromator according to claim 8, wherein the width of the slit disposed adjacent to said prism at the end of the optical path in the monochromator is made by a constant value $a$ greater than the width of the intermediate slit, said value being not smaller than a sum of $a_r$ and $a_T$ expressed by $$a_r = D_p \cdot \Delta\lambda_r$$

$$a_T = D_p \cdot \Delta\lambda_T$$

where $D_p$ is a line dispersion of the monochromator portion due to the prism, $\Delta\lambda_r$ is a deviation of wavelength resulting from the rotational error of the prism and $\Delta\lambda_T$ is a deviation of wavelength resulting from the variation of refractive index of the prism due to the variation of temperature.

10. A double monochromator according to claim 9, wherein the slits other than the slit disposed adjacent to said prism at the end of the optical path in the monochromator is equal.

11. A double monochromator according to claim 10, including a device for varying all the widths of the slits while holding said value $a$ constant.

12. A double monochromator according to claim 11, wherein the prism and diffraction grating are arranged in the mode of an additive dispersion.

* * * * *